Dec. 15, 1925.

L. B. POWERS

SNAP HOOK

Filed May 5, 1925

1,565,392

Inventor
L. B. Powers
By D. Swift
his Attorney

Patented Dec. 15, 1925.

1,565,392

UNITED STATES PATENT OFFICE.

LAWRENCE B. POWERS, OF FULTON, SOUTH DAKOTA.

SNAP HOOK.

Application filed May 5, 1925. Serial No. 28,117.

*To all whom it may concern:*

Be it known that I, LAWRENCE B. POWERS, citizen of the United States, residing at Fulton, in the county of Hanson and State of South Dakota, have invented certain new and useful Improvements in Snap Hooks, of which the following is a specification.

The invention relates to snap hooks, and has for its object to provide a device of this character which is separable, and provided with means whereby it may be easily and quickly attached to a loop, for instance a harness loop without the necessity or expense of opening the loop, or unriveting the loop.

A further object is to provide a snap hook comprising a separable member having oppositely disposed arms, which arms are provided with spaced arms extending towards each other and having convex and concave engaging ends, and a securing bolt extending through the rear inwardly extending arm for securing the oppositely disposed arms together. Also to provide a hook pivotally mounted on a removable bolt between the oppositely disposed members, and a spring catch extending rearwardly and downwardly, and provided with a loop through which the removable bolt extends, thereby allowing the spring catch to be easily removed and replaced, which is one of the main difficulties with snap hooks as at present constructed.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
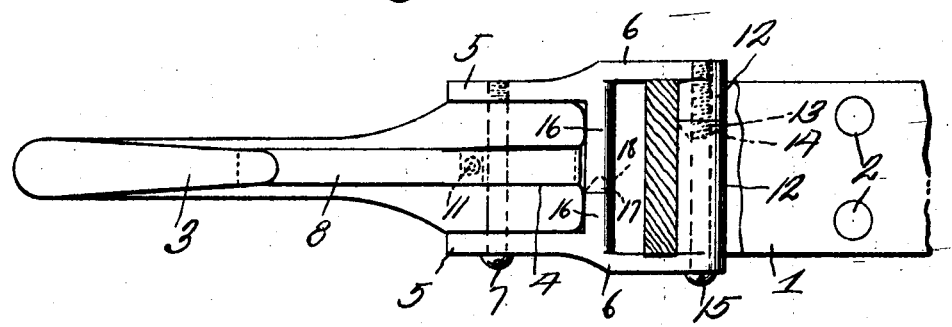
Figure 1 is a top plan view of the snap hook.
Figure 2:
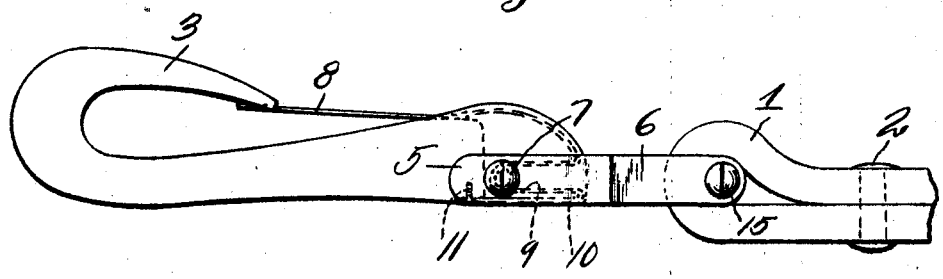
Figure 2 is a side elevation of the snap hook.
Figure 3:
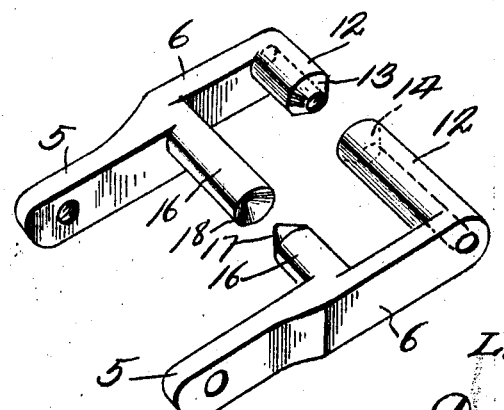
Figure 3 is a detail collective view of the parts of the separable member showing the same in position to be assembled.

Referring to the drawing, the numeral 1 designates the loop of a piece of harness, which loop is formed in the usual manner by bending a strap upon itself, and securing the same together by means of rivets 2, however many harness loops are formed by sewing the parts together, and it is obvious that when a conventional form of snap hook is used, and it becomes broken, to replace the same with a new hook, it is necessary to open the loop by removing the rivets 2 or in case of sewing, to remove the stitches, and which operation is often a very expensive one. The present snap hook comprises the hook member 3, the rear end of which is provided with a bifurcation 4 and is disposed between the outer end 5 of the oppositely disposed separable members 6. Extending through the arms 5 and the bifurcated end of the hook is a removable screw 7 on which the hook is pivotally mounted, and which screw may be easily and quickly removed for removing the hook for repair or replacement purposes. The hook is provided with a leaf spring 8, which cooperates with the hook in the usual manner, and which leaf spring extends inwardly to the rear end of the hook and is provided with an outwardly extending looped portion 9 through which the removable screw extends, and with a reversed positioned looped portion 10, the end of which is secured to the under side of the hook by means of a screw 11, therefore it will be seen if the spring 8 should be broken, it may be easily and quickly replaced with a new spring by simply removing the screw 7 which extends through the looped portion 9, and which operation will allow the spring 8 to be easily and quickly removed and a new spring placed in position. The separable members are provided with inwardly extending registering arms 12, which have cone and socket connections 14 for maintaining the same in registration and through which arms 12 a securing screw 15 extends, and which arms may be easily and quickly placed in the loop 1 without opening the loop. By providing the cone and socket connections 13 and 14 lateral shearing strain of any kind on the screw 15 is obviated. The members 6 are provided, intermediate their ends, with inwardly extending arms 16, which have cone and socket connections 17 and 18, and which arms maintain the members 6 in accurate spaced relation upon the tightening of the screw 7, and at the same time brace the device so that it will stand the maximum amount of strain.

From the above it will be seen that a separable snap hook connection is provided, which is particularly adapted for use in connection with harness snap hooks, and the device may be easily and quickly separated for allowing a snap hook to be attached to a harness loop without the necessity of opening the loop. It will also be seen that a snap hook spring is provided which may be easily and quickly removed from the snap hook when it is desired to place a new spring therein, which obviates the present practice where the springs are imbedded in the snap hooks, of attaching an entirely new snap hook.

The invention having been set forth what is claimed as new and useful is:—

1. A harness hook comprising a hook section, a link section, said link section comprising oppositely disposed members, arms carried by said oppositely disposed members and in axial engagement, interengaging means between the adjacent ends of the arms, one of said arms forming means for extending through a harness loop, said hook section being disposed between the oppositely disposed members, a removable member extending through the oppositely disposed members and the hook section and forming a pivotal point for the hook section and a removable securing member extending through the loop receiving arms and forming means for holding the oppositely disposed members together.

2. The combination with a snap hook, a strap loop, a link connection between the hook and the strap loop, of a spring, said spring engaging the end of the hook and extending rearwardly, the rear end of said spring being provided with an outwardly extending loop, a transversely disposed removable screw extending through the link, the rear end of the hook and the spring loop, said spring loop being provided with an outwardly extending portion detachably connected to the underside of the hook.

In testimony whereof I affix my signature.

LAWRENCE B. POWERS.